UNITED STATES PATENT OFFICE.

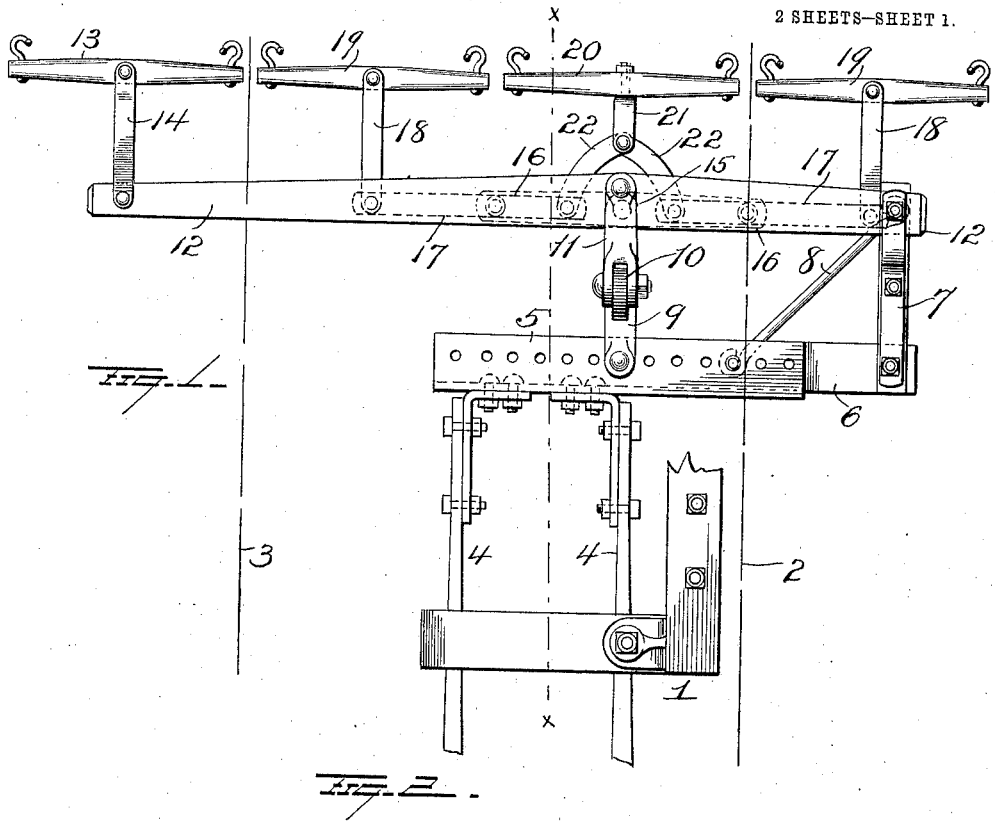
G. S. DUFFIN.
DRAFT EQUALIZER.
APPLICATION FILED JULY 20, 1911.
1,040,174.
Patented Oct. 1, 1912.
2 SHEETS—SHEET 1.
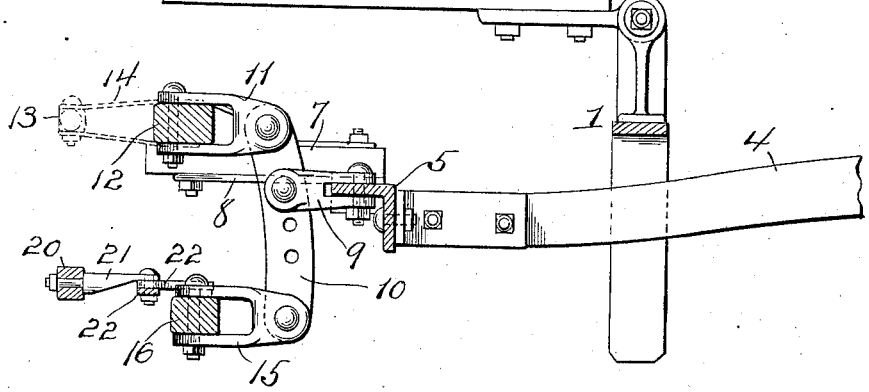
WITNESSES
INVENTOR
G. S. Duffin
By H. A. Seymour
Attorneys G. S. DUFFIN.
DRAFT EQUALIZER.
APPLICATION FILED JULY 20, 1911.
1,040,174.
Patented Oct. 1, 1912.
2 SHEETS—SHEET 2.
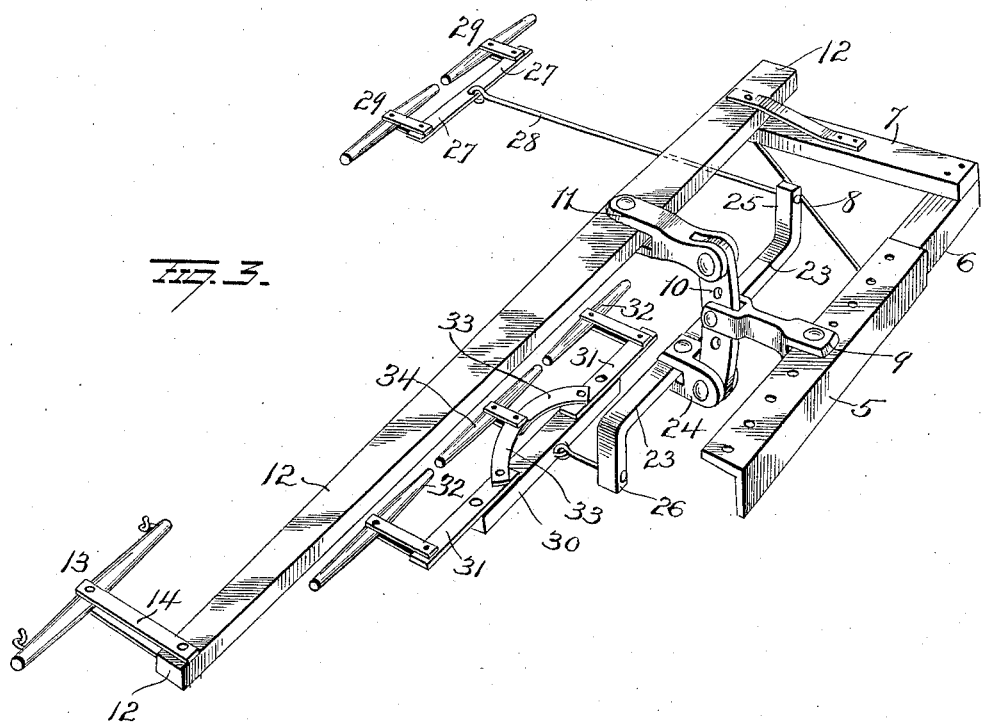
WITNESSES
E. S. Nottingham
G. F. Downing
INVENTOR
G. S. Duffin
By H. A. Seymour
Attorney

GEORGE S. DUFFIN, OF HOOPESTON, ILLINOIS.

DRAFT-EQUALIZER.

1,040,174. Specification of Letters Patent. Patented Oct. 1, 1912.

Application filed July 20, 1911. Serial No. 639,687.

*To all whom it may concern:*

Be it known that I, GEORGE S. DUFFIN, of Hoopeston, in the county of Vermilion and State of Illinois, have invented certain new and useful Improvements in Draft-Equalizers; and I do hereby declare the following to be a full, clear, and exact description of the invention, such as will enable others skilled in the art to which it appertains to make and use the same.

This invention relates to an improvement in draft equalizers and more particularly to such as are especially adapted for use with sulky plows,—one object of the invention being to so construct and arrange the equalizing appliances that certain members thereof can be superimposed and all connected with the plow frame through the medium of a vertically disposed pivoted lever attached to the plow frame approximately in line with the plow beam nearest the furrow wheel.

With this and other objects in view the invention consists in certain novel features of construction and combinations of parts as hereinafter set forth and pointed out in the claim.

In the accompanying drawings, Figure 1 is a plan view illustrating my improvements and the application of the same to a sulky plow. Fig. 2 is a view in section on the line x—x of Fig. 1, and Fig. 3 is a view illustrating modifications.

1 represents a portion of the frame of a sulky plow and 2—3 indicate the lines of the furrow and land wheels respectively.

The forward ends of the beams 4—4 which constitute portions of the plow frame have secured thereto, a clevis bar 5 and from one end of this clevis bar an arm 6 projects laterally beyond the line of the furrow wheel. A forwardly projecting arm 7 is secured to the free end of the arm 6 and a brace 8 extends from the forward end of the arm 7 rearwardly to the front end of the plow frame,—said arms 6 and 7 and the brace 8 constituting a forwardly projecting bracket to one side of the plow frame.

A link or clevis 9 is pivotally attached to the clevis bar 5 so as to have horizontal pivotal movement relatively thereto and to the forward end of this clevis or link, a vertically disposed lever 10 is pivotally attached between its ends. A link or clevis 11 is pivoted to the upper end of the lever 10 and is bifurcated to receive a long lever 12 with which it is pivotally connected at a point between the ends of said lever. From its pivotal connection with the link 11, the lever 12 projects to the arm 7 with which it is pivotally connected. The long arm of the lever 12 extends laterally in the reverse direction and its free end terminates somewhat outside of alinement with the land wheel 3. It will thus be seen that the pivotal connection of the lever 12 with the vertical lever 10 will be approximately in line with the plow beam nearest the furrow wheel and that said lever 12 is of sufficient length to project at its ends somewhat beyond the lines of the furrow and land wheels. Near the free end of the long arm of lever 12, a swingle-tree 13 is connected through the medium of suitable links 14.

To the lower end of the vertically disposed lever 10, a link or clevis 15 (the same in construction as the link or clevis 11) is pivotally attached and to this link or clevis 15, a double-tree 16 is pivotally connected. Levers 17—17 are pivotally connected between their ends to the double-tree 16 in proximity to the ends of the latter. The long arms of the levers 17 project beyond the ends of the double-tree 16 and have connected therewith, through the medium of links 18, swingle-trees 19. A swingle-tree 20 is located between the swingle-trees 19 and is connected by means of a link 21 with the meeting ends of links 22,—the outer ends of the latter being connected with the short arms of levers 17 near the inner ends of the same.

In the construction shown in Fig. 3, which is adapted for six horses, a lever 23 is substituted for the double-tree 16, which lever is pivotally attached between its ends in bifurcated block 24, the latter being pivoted (at right angles to the pivotal connection therewith of the lever 23) to the lower end of the vertical lever 10. The lever 23 is thus disposed horizontally and is provided at its respective ends with arms 25—26. A double-tree 27 is connected, by means of a chain or rod 28 with the arm 25 of lever 23 and with said double-tree, two swingle-trees 29 are connected. To the arm 26 of lever 23 a double-tree 30 is connected and this double-tree carries pivoted levers 31, to the outer ends of which latter, swingle-trees 32 are connected. The inner ends of the levers 31 are connected by links 33 and with these links, a swingle-tree 34 is connected and disposed between the swingle-trees 31. The draft devices connected with the lower end of the vertical lever 10, thus accommodate five horses, the sixth horse being connected with a swingle tree at the free end of the long arm of the lever 12, the same as above described in connection with the construction shown in Figs. 1 and 2.

In the four or six horse equalizer, the draft attachments for one horse are located above the draft attachments for three horses in the four horse equalizer and above these for five horses in the six horse equalizer, and in both constructions one horse draft attachment is connected with the upper end of the vertical equalizing lever 10, while the other attachments are all connected with the lower end of the lever. The construction and arrangement of parts is such that the draft strains are transmitted directly through the vertically disposed lever 10 pivoted to the clevis bar rigidly secured to the forward ends of the plow beams whereby such strains are concentrated at a point approximately in line with the plow beam nearest the furrow wheel and causes the plow to run smooth and true. In other words the construction described obviates the transmission of draft strains in such manner as will cause the plow to run out of true.

Having fully described my invention what I claim as new and desire to secure by Letters-Patent is,—

The combination with a clevis bar rigidly secured to the forward ends of a plurality of plow beams and a bracket rigidly secured to one end of the clevis bar, of a vertical lever pivotally connected with the clevis bar at a point in line with the plow beam nearest the furrow wheel, a lever pivoted intermediate its ends to the upper end of said vertical lever and having its short arm pivoted to said bracket, and a swingle tree connected with its long arm, and a double tree pivoted to the lower arm of said vertical lever, and three swingle trees connected with said double tree.

In testimony whereof, I have signed this specification in the presence of two subscribing witnesses.

GEORGE S. DUFFIN.

Witnesses:
CHAS. L. TILTON,
EVERETT E. GATES.

---

Copies of this patent may be obtained for five cents each, by addressing the "Commissioner of Patents, Washington, D. C."